US011030052B2

(12) United States Patent
Gopinath et al.

(10) Patent No.: US 11,030,052 B2
(45) Date of Patent: *Jun. 8, 2021

(54) DATA PROTECTION USING CHECKPOINT RESTART FOR CLUSTER SHARED RESOURCES

(71) Applicant: EMC IP Holding Company LLC, Hopkinton, MA (US)

(72) Inventors: Ajith Gopinath, Bangalore (IN); Sathyamoorthy Viswanathan, Tamil Nadu (IN); Kishore Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/123,997

(22) Filed: Sep. 6, 2018

(65) Prior Publication Data
US 2019/0004908 A1 Jan. 3, 2019

Related U.S. Application Data

(63) Continuation of application No. 14/752,371, filed on Jun. 26, 2015, now Pat. No. 10,108,502.

(51) Int. Cl.
*G06F 11/14* (2006.01)
*G06F 11/20* (2006.01)

(52) U.S. Cl.
CPC ........ *G06F 11/1451* (2013.01); *G06F 11/203* (2013.01); *G06F 11/1464* (2013.01); *G06F 11/2035* (2013.01); *G06F 11/2046* (2013.01); *G06F 2201/84* (2013.01)

(58) Field of Classification Search
CPC .............. G06F 11/1451; G06F 11/203; G06F 11/1464; G06F 11/2035; G06F 11/2046; G06F 2201/84
See application file for complete search history.

(56) References Cited

U.S. PATENT DOCUMENTS

| 7,496,783 | B1 | 2/2009 | Graf | |
|---|---|---|---|---|
| 7,904,906 | B2 | 3/2011 | Puthukattukaran | |
| 8,127,174 | B1 | 2/2012 | Shah | |
| 8,473,463 | B1 * | 6/2013 | Wilk | G06F 11/1453 707/647 |
| 8,886,609 | B2 * | 11/2014 | Buragohain | G06F 11/1461 707/649 |

(Continued)

OTHER PUBLICATIONS

Shadow Copy. Wikipedia. Dec. 18, 2019 [retrieved on Jun. 4, 2020]. Retrieved from the Internet: <URL: https://en.wikipedia.org/wiki/Shadow_Copy#cite_note-3>.*

*Primary Examiner* — Kamini B Patel
(74) *Attorney, Agent, or Firm* — Krishendu Gupta; Nikhil Patel

(57) ABSTRACT

Techniques to back up a cluster resource are disclosed. In various embodiments, an active cluster node is used to take and store persistently on a cluster shared volume a snapshot of the cluster shared volume. The persistent snapshot is used to back up the cluster shared volume, including by storing checkpoint information indicating as the backup progresses which portions of the snapshot have been backed up. A cluster environment with which the cluster shared volume is associated is monitored to detect any failover or failback affecting the backup.

22 Claims, 4 Drawing Sheets

(56) References Cited

U.S. PATENT DOCUMENTS

| | | |
|---|---|---|
| 2003/0126240 A1 | 7/2003 | Vosseler |
| 2004/0153558 A1 | 8/2004 | Gunduc |
| 2009/0276590 A1* | 11/2009 | Nagaraj .............. G06F 11/1443 |
| | | 711/162 |
| 2010/0077165 A1* | 3/2010 | Lu ....................... G06F 11/1451 |
| | | 711/162 |
| 2011/0072430 A1 | 3/2011 | Mani |
| 2015/0378623 A1* | 12/2015 | White ................... G06F 9/4856 |
| | | 711/162 |

* cited by examiner

DATA PROTECTION USING CHECKPOINT RESTART FOR CLUSTER SHARED RESOURCES

CROSS REFERENCE TO OTHER APPLICATIONS

This application is a continuation of co-pending U.S. patent application Ser. No. 14/752,371, entitled DATA PROTECTION USING CHECKPOINT RESTART FOR CLUSTER SHARED RESOURCES filed Jun. 26, 2015 which is incorporated herein by reference for all purposes.

BACKGROUND OF THE INVENTION

Failover and failback policies may be configured in a cluster environment, such as a Microsoft® Cluster Service (MSCS) environment, to ensure high availability of the hosted application and services. Failover clusters provide high availability and scalability to server workloads. These may include server applications such as Microsoft® Exchange Server, Hyper-V®, Microsoft SQL Server® and file servers.

In a failover cluster, if one or more of the clustered servers (nodes) fails, other nodes begin to provide service (a process known as failover). In addition, the clustered roles/services are proactively monitored to verify that they are working properly. If they are not working, they restart or move to another node. Failover clusters also provide Cluster Shared Volume (CSV) functionality that provides a consistent, distributed namespace that clustered roles can use to access shared storage from all nodes.

If the customer has configured failback, the cluster services are moved back to the original node when it becomes active again.

When backup is performed on the virtual cluster node, the backup of the shared disk typically will be performed through the current active node in the cluster. For example, a virtual shadow copy service (VSS) or other snapshot may be taken and used to back up the virtual resource, such as a CSV volume. In prior approaches, the snapshot was not stored persistently. In such approaches, during a failover or failback the backup is interrupted and the VSS snapshot created for the shared disk typically is lost. If configured to do so, the backup solution (e.g., EMC® Networker®) will restart the backup again from the failover node. The process of creating a new VSS snapshot of the shared disk and performing backup will be repeated all over again.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to protect the data of the virtual cluster client even in event of a cluster failover/failback are disclosed. In various embodiments, a persistent VSS shadow copy of the shared drive is created and retained until the backup is completed or aborted by the user. The VSS snapshot is by default stored in the shared volume itself. On failover, a checkpoint may be stored to indicate how much of the persistently stored snapshot had been backed up successfully prior to the failover. The checkpoint may be used to restart the backup, beginning from that point, once the cluster node to which the virtual client performing the backup process has failed over has come online.

Figure 1:
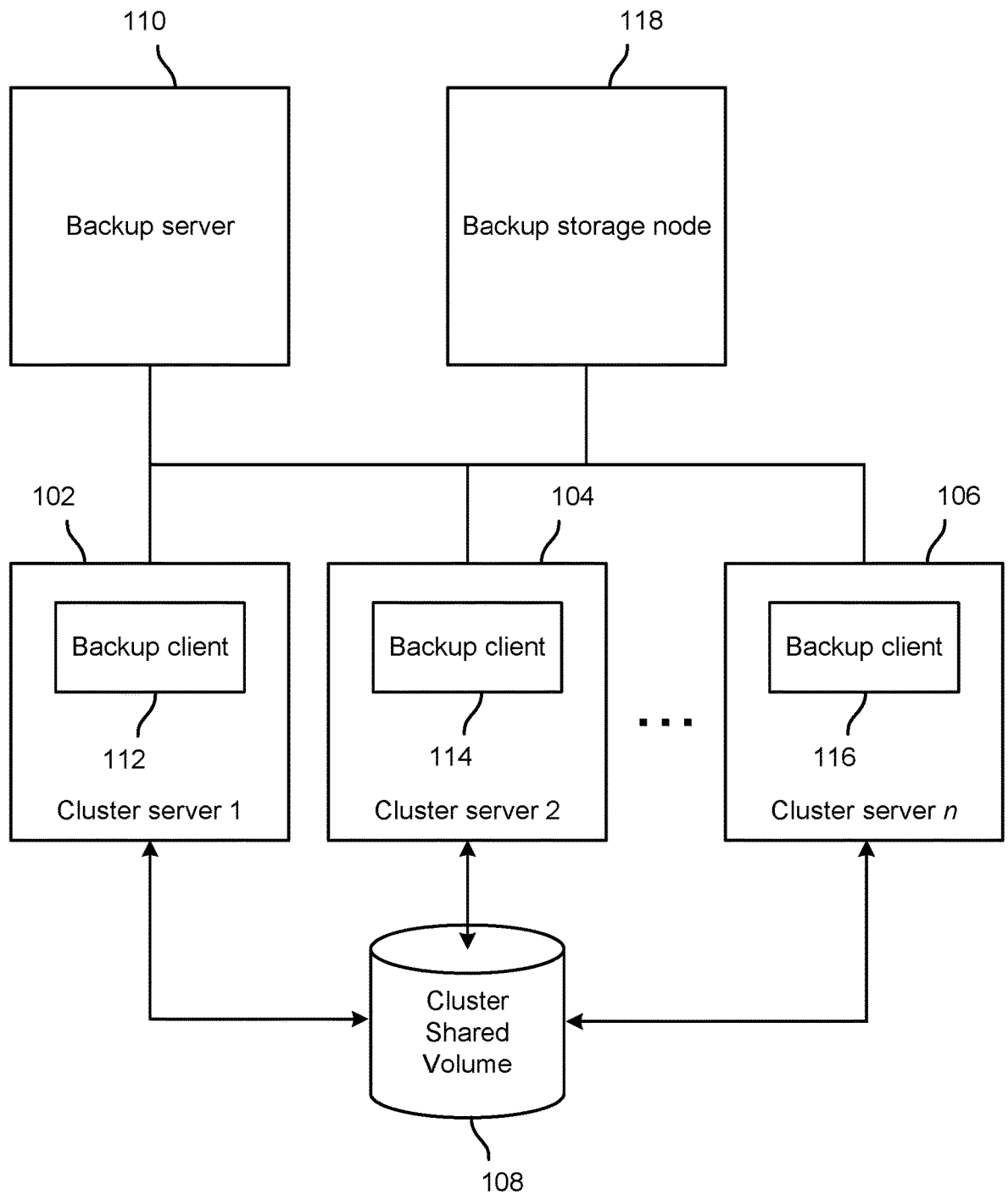
FIG. 1 is a block diagram illustrating an embodiment of a system to back up a cluster shared volume (CSV) or other cluster resource.

FIG. 1 is a block diagram illustrating an embodiment of a system to back up a cluster shared volume (CSV) or other cluster resource. In the example shown, a cluster that includes a plurality of cluster servers 1 through n, represented in FIG. 1 by cluster servers 102, 104, and 106, has shared access to a cluster shared volume (CSV) 108. A backup server 110 is configured to backup up data associated with cluster servers 102, 104, and 106, including in this example data associated with CSV volume 108. The backup server 110, e.g., an EMC® Networker® backup server, is configured to use backup clients 112, 114, and 116 on each cluster server (102, 104, 106) to perform backup operations on and/or using that server. Under control and coordination of backup server 110, the backup clients 112, 114, 116 send backup data, via one or more "saveset" backup streams, to backup storage node 118. In various embodiments, a "saveset" may comprise one or more volumes and/or other defined sets of data that the backup system, including backup server 110 and backup clients 112, 114, 116, may be configured to back up as a set. In some embodiments, a virtual backup client or other virtual client associated with the cluster may be used to back up a cluster resource, such as CSV 108.

In various embodiments, the system of FIG. 1 may include a plurality of "m" CSV volumes associated with the cluster servers 1 to n. Each server in the cluster may have shared access to each CSV volume associated with the cluster. For example, each server in the cluster may have access to read from and write to each of the CSV volumes.

Techniques to back up a CSV volume or other cluster resource in a manner such that the backup does not have to be started over from the beginning upon failover or failback are disclosed. In various embodiments, to back up a CSV volume a persistent snapshot is taken of the CSV volume. The snapshot is stored on the CSV volume itself, making it accessible to all servers in the cluster. A checkpoint or other data to keep track of which portions of the snapshot have been backed up so far is stored. Upon failover, a furthest checkpoint is used to restart the backup on a cluster server to which the cluster service has failed over/back. In various embodiments, this approach enables the backup to be resumed from a point at which a previous cluster server had gotten prior to failover, without having to take a new snapshot and/or restart from the beginning.

Figure 2:
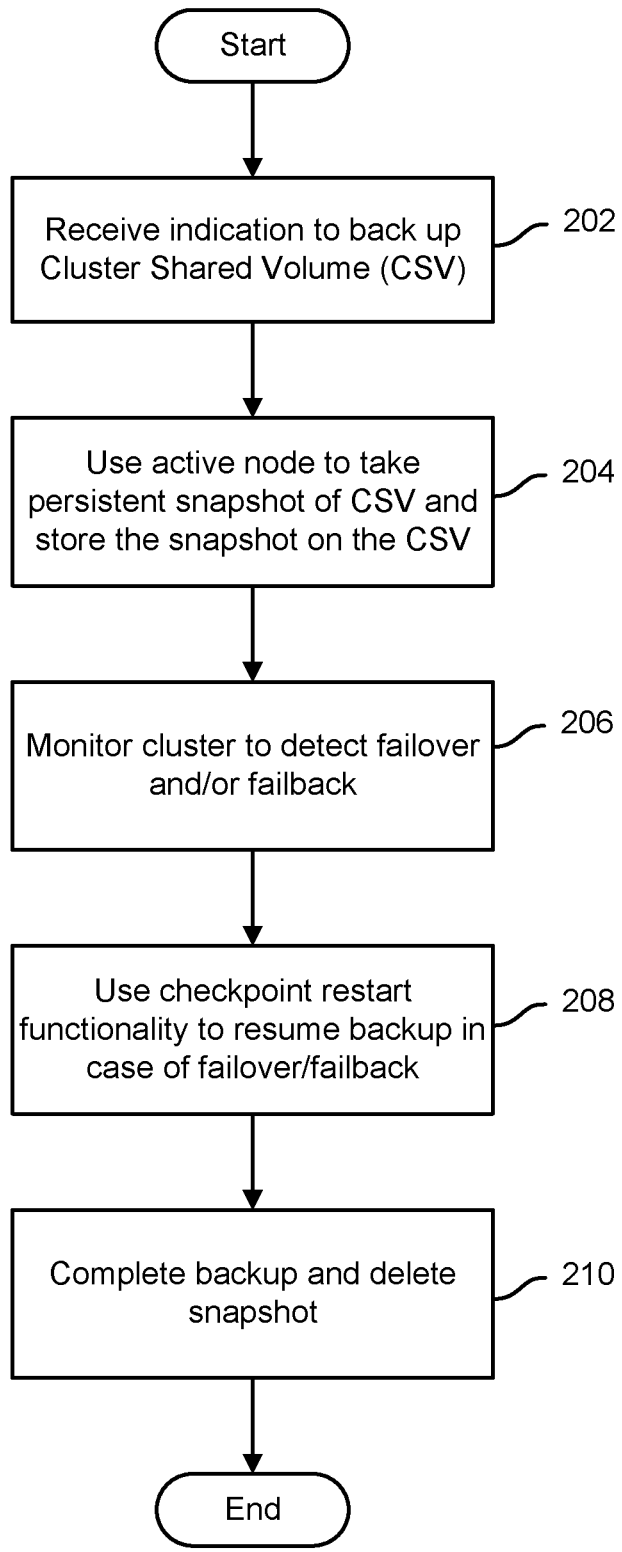
FIG. 2 is a flow chart illustrating an embodiment of a process to back up a cluster virtual resource.

FIG. 2 is a flow chart illustrating an embodiment of a process to back up a cluster virtual resource. In various embodiments, the process of FIG. 2 may be performed by a backup server, such as backup server 110 of FIG. 1, and/or one or more virtual or other backup clients, such as backup clients 112, 114, and 116 of FIG. 1. In the example shown, an indication is received to back up a cluster shared volume (CSV) or other shared resource (202). For example, a scheduled time to perform the backup may have arrived. A cluster node that is currently active with respect to the shared resource is used to take a snapshot (or other copy) of the volume and to store the snapshot on the volume itself (204). For example, a virtual shadow copy service (VSS) snapshot may be taken. In various embodiments, the snapshot may be taken and stored persistently on the CSV or other volume by invoking the virtual shadow copy service (VSS) in a manner that causes the snapshot to be store persistently on the volume. For example, a snapshot of a type that is stored persistently and/or that is specified to be taken using certain attributes selected to cause the snapshot to be store persistently on the volume may be taken.

As the backup proceeds, using the persistently-stored snapshot, the cluster is monitored to detect any failover/failback (206). In some embodiments, a cluster service application programming interface (API), e.g., an API of the Microsoft® Cluster Service (MSCS), is used to poll the cluster environment at a prescribed interval to be able to detect that a failover/failback has occurred, and to determine that failover/failback of the cluster service to a destination cluster node has been completed. In the event of failover/failback, once the failover/failback is determined to be completed and the cluster service back online, a checkpoint restart capability of the backup solution (e.g., EMC® Networker®) is used to resume the backup starting from a point to which the previously active cluster node, i.e., the one that just failed over or back to the currently active cluster node, had backed the snapshot up successfully prior to the failover or failback (208). The persistently-stored snapshot of the volume is available to the cluster node to which failover/failback has occurred, since it is stored on the volume itself and the volume is accessible to the servers in the cluster. The checkpoint information is used to enable the destination cluster node to resume the backup from the point up to which the previously-active cluster node had backed the snapshot up prior to the failover/failback. In some embodiments, the checkpoint comprises a pointer that tells the destination node where to pick up where the predecessor node left off in backing up the snapshot. The backup is completed and the persistently stored snapshot is deleted (210).

Figure 3:
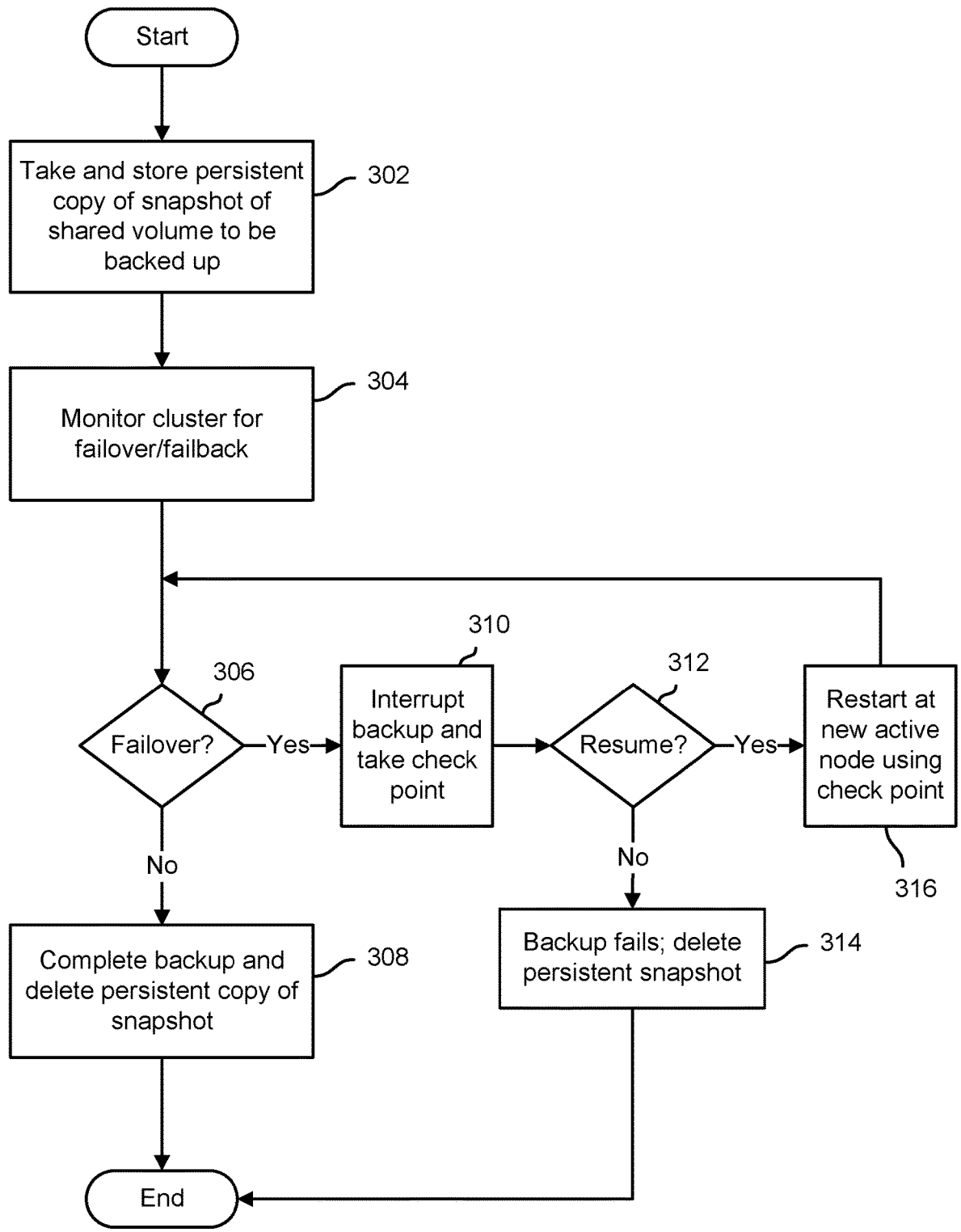
FIG. 3 is a flow chart illustrating an embodiment of a process to back up a cluster virtual resource.

FIG. 3 is a flow chart illustrating an embodiment of a process to back up a cluster virtual resource. In various embodiments, the process of FIG. 2 may be performed by a backup server, such as backup server 110 of FIG. 1, and/or one or more virtual or other backup clients, such as backup clients 112, 114, and 116 of FIG. 1. In the example shown, a snapshot of a cluster virtual resource, e.g., a CSV volume such as CSV volume 108 of FIG. 1, is taken and stored persistently on the volume (302). The cluster is monitored for any failover/failback affecting the backup (304). If no failover (or failback) occurs (306), the originally active node completes the backup and the persistently stored snapshot is deleted (308). In the event of a failover (or failback) (306), the backup is interrupted and a checkpoint data reflecting the progress of the backup up to the point of failover (or failback), i.e., how much of the persistently stored snapshot had been confirmed to have been backed up prior to the failover/failback, is stored (310). The cluster is monitored, e.g., using a cluster environment API, to detect when/if the cluster service has been brought back online at the cluster node to which the service failed over/back. If the service does not come back online prior to a prescribed/configured timeout (312), then the backup fails (314) and a new attempt is made to back up the resource, starting over from the beginning, e.g., a new iteration or instance of the process of FIG. 3. If the cluster service fails over successfully to the destination cluster node (312), the newly-active node to which the service failed over is used to resume the backup starting from the most recently saved checkpoint (316), and processing continues until the backup is completed and the persistently stored snapshot is deleted (306, 308).

Figure 4:
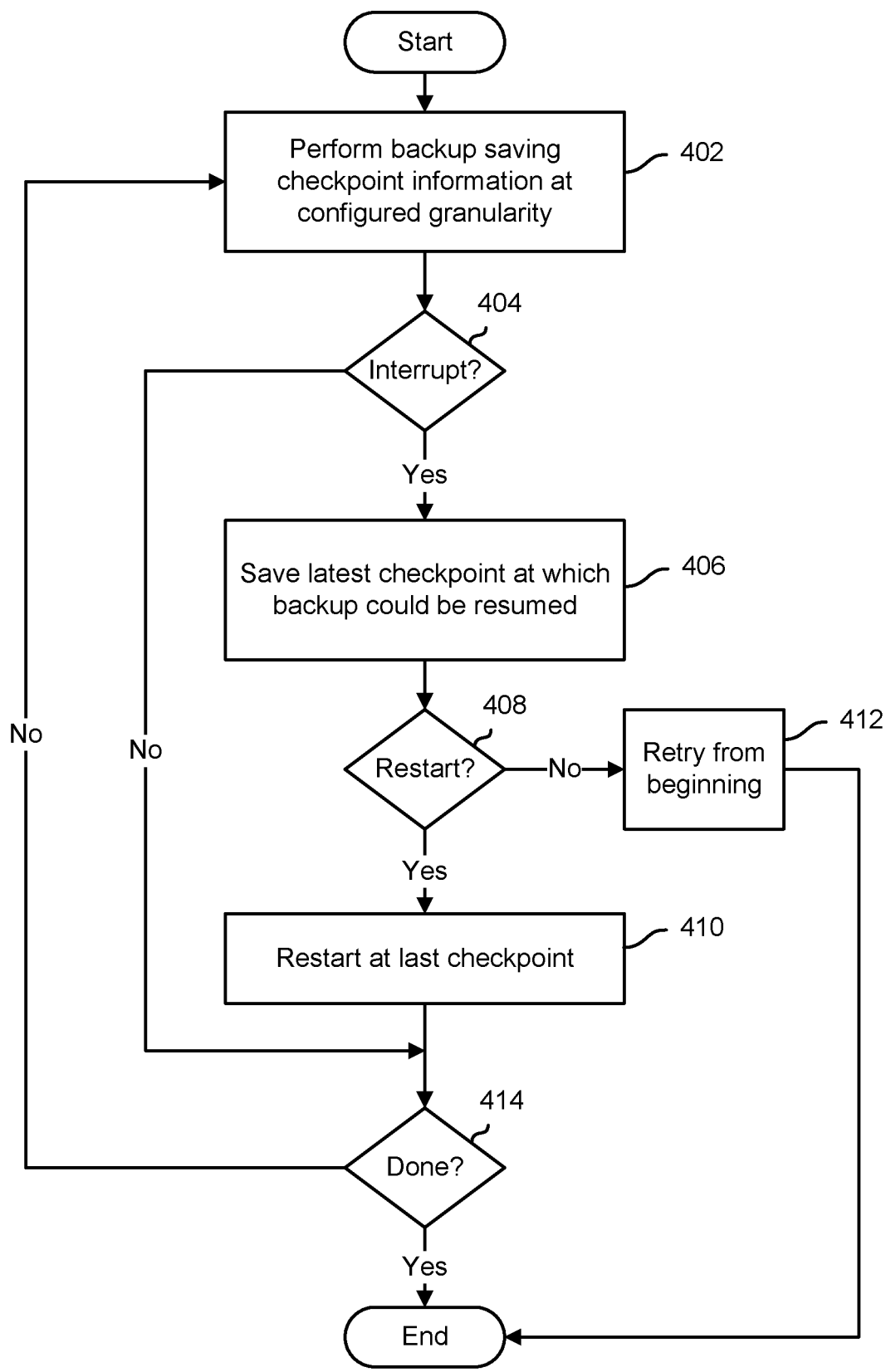
FIG. 4 is a flow chart illustrating an embodiment of a process to back up a persistently stored shadow copy of a virtual resource.

FIG. 4 is a flow chart illustrating an embodiment of a process to back up a persistently stored shadow copy of a virtual resource. In various embodiments, the process of FIG. 2 may be performed by a backup server, such as backup server 110 of FIG. 1, and/or one or more virtual or other backup clients, such as backup clients 112, 114, and 116 of FIG. 1. In the example shown, while the backup is performed checkpoint information is saved at a prescribed/configured interval and/or granularity (e.g., files completed, directories completed, etc.) (402). If the backup is interrupted, e.g., in the case of failover or failback from a currently active cluster node to another node in the cluster, then a most recently stored checkpoint information is saved (406). If the cluster service comes back online at the cluster node to which failover or failback has occurred within a prescribed timeout period (408), then the backup is resumed starting from the most recently save checkpoint (410). If failover/failback occurs and the backup restart timer expires prior to the cluster service coming back online (408), then the backup is reset to the beginning and a new attempt is made to back up the resource (412). If no failover/failback occurs, or if the backup has been able to be resumed after any failover/failback that may have occurred (404, 406, 408, 410), then processing continues until the backup has been completed (414) after which the process of FIG. 4 ends.

Using techniques disclosed herein, backup of resources associated with a cluster environment can be resumed and completed in the event a failover/failback from one cluster node to another occurs while a backup is being performed.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method of backing up a cluster resource, comprising:
determining, by one or more processors, that backup of a cluster shared volume is to be performed; and
in response to determining that the backup of the cluster shared volume is to be performed:
causing, by the one or more processors, an active cluster node to take and store persistently on the cluster shared volume a persistent snapshot of the cluster shared volume;
using, by the one or more processors, the persistent snapshot to back up the cluster shared volume to a backup storage node connected to the active cluster node via a network, including by storing checkpoint information indicating as the backup progresses which portions of the persistent snapshot have been backed up, wherein using the active cluster node to take and store persistently on the cluster shared volume the persistent snapshot of the cluster shared volume includes invoking a virtual shadow copy service (VSS) in a manner that results in the persistent snapshot being store persistently on the cluster shared volume; and
in response to a determination that a failure is detected, restarting a backup of the cluster shared volume based at least in part on the checkpoint information.

2. The method of claim 1, further comprising detecting the failure.

3. The method of claim 2, further comprising determining that a cluster service with which the backup is associated has become available after the failure.

4. The method of claim 3, wherein restarting the backup of the cluster shared volume based at least in part on the checkpoint information comprises:
using a most recently stored checkpoint information to resume the backup starting at a point determined based at least in part on the most recently stored checkpoint information.

5. The method of claim 2, wherein the failure is a failover or a failback.

6. The method of claim 1, wherein using the active cluster node to take and store persistently on the cluster shared volume the persistent snapshot of the cluster shared volume includes invoking a virtual shadow copy service (VSS) in a manner that results in the persistent snapshot being store persistently on the cluster shared volume.

7. The method of claim 1, further comprising: monitoring, by the one or more processors, a cluster environment with which the cluster shared volume is associated to detect an occurrence of a failure affecting the backup, wherein monitoring the cluster environment with which the cluster shared volume is associated to detect the failure affecting the backup includes using an application programming interface (API) associated with the cluster environment to poll the cluster environment periodically to determine whether the failure has occurred.

8. The method of claim 1, further comprising restarting the backup from a beginning a backup snapshot in response to a determination that the failure occurs and a cluster service with which the backup is associated does not become available again within a prescribed timeout period.

9. The method of claim 1, further comprising completing the backup and deleting the persistent snapshot.

10. The method of claim 1, wherein the restarting the backup of the cluster shared volume based at least in part on the checkpoint information comprises determining portions of the cluster shared volume to backup based on the checkpoint information.

11. The method of claim 1, further comprising:
determining that backup of the cluster shared volume is complete; and
in response to a determination that the backup of the cluster shared volume is complete, deleting the persistent snapshot of the cluster shared volume from the cluster shared volume.

12. The method of claim 1, further comprising: monitoring, by the one or more processors, a cluster environment with which the cluster shared volume is associated to detect an occurrence of a failure affecting the backup, wherein the monitoring to detect the occurrence of a failure affecting the backup comprises determining whether a backup of the persistent snapshot to the cluster shared volume is interrupted.

13. The method of claim 1, wherein the persistent snapshot corresponds to a persistent virtual shadow copy service (VSS) shadow copy of the cluster shared volume.

14. The method of claim 1, wherein the persistent snapshot is retained until back up of the cluster shared volume is completed.

15. The method of claim 1, further comprising:
receiving an indication to backup the cluster resource,
wherein the determining that the backup of the cluster shared volume is to be performed is based at least in part on the receiving the indication to backup the cluster resource.

16. The method of claim 1, wherein the persistently storing the persistent snapshot of the cluster shared volume comprises storing the persistent snapshot of the cluster shared volume on the cluster shared volume.

17. The method of claim 1, wherein the persistent snapshot of the cluster shared volume is made available to a cluster node for which the failure occurred.

18. The method of claim 1, wherein the checkpoint information is stored at a predefined granularity.

19. The method of claim 1, wherein the persistent snapshot is stored on the same cluster shared volume to which the persistent snapshot corresponds.

20. The method of claim 1, wherein persistent snapshot is deleted in response to a determination that the backup of the cluster shared volume to which the persistent snapshot corresponds is completed.

21. A system to back up a cluster resource, comprising: a communication interface; and a processor coupled to the communication interface and configured to: determine that backup of a cluster shared volume is to be performed; and in response to determining that the backup of the cluster shared volume is to be performed: cause an active cluster node to take and store persistently on the cluster shared volume a persistent snapshot of the cluster shared volume; use the persistent snapshot to back up the cluster shared volume to a backup storage node connected to the active cluster node via a network, including by storing checkpoint information indicating as the backup progresses which portions of the persistent snapshot have been backed up, wherein using the active cluster node to take and store persistently on the cluster shared volume the persistent snapshot of the cluster shared volume includes invoking a virtual shadow copy service (VSS) in a manner that results in the persistent snapshot being store persistently on the cluster shared volume; and in response to a determination that a failure is detected, restarting a backup of the cluster shared volume based at least in part on the checkpoint information.

22. A computer program product to back up a cluster resource, the computer program product being embodied in a non-transitory computer readable medium and comprising computer instructions for:

determining, by one or more processors, that backup of a cluster shared volume is to be performed; and in response to determining that the backup of the cluster shared volume is to be performed: cause an active duster node to take and store persistently on the duster shared volume a persistent snapshot of the duster shared volume; using the persistent snapshot to back up the cluster shared volume to a backup storage node connected to the active cluster node via a network, including by storing checkpoint information indicating as the backup progresses which portions of the persistent snapshot have been backed up, wherein using the active duster node to take and store persistently on the cluster shared volume the persistent snapshot of the cluster shared volume includes invoking a virtual shadow copy service (VSS) in a manner that results in the persistent snapshot being store persistently on the cluster shared volume; and in response to a determination that a failure is detected, restarting a backup of the cluster shared volume based at least in part on the checkpoint information.

* * * * *